Aug. 11, 1959 W. A. MAXWELL 2,898,660
METHOD FOR IMPROVING THE HIGH-TEMPERATURE STRENGTH
AND OTHER PROPERTIES OF MOLYBDENUM DISILICIDE
AND OTHER INTERMETALLIC COMPOUNDS
Filed April 24, 1953
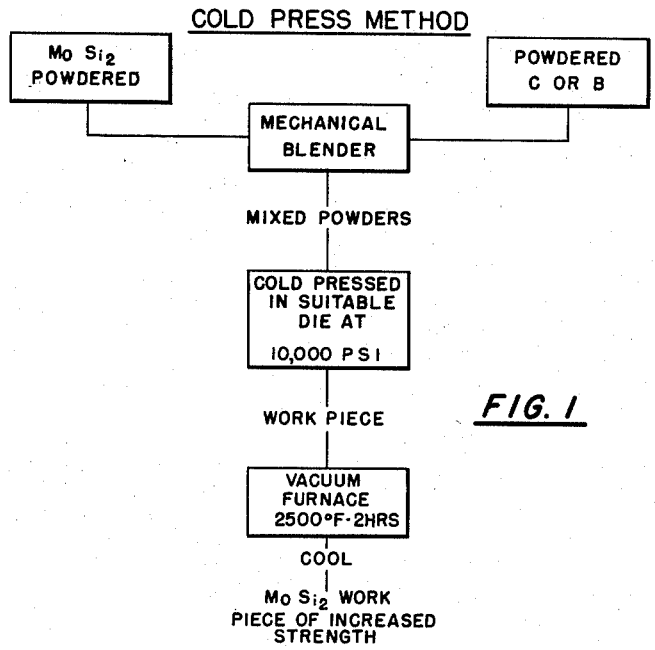
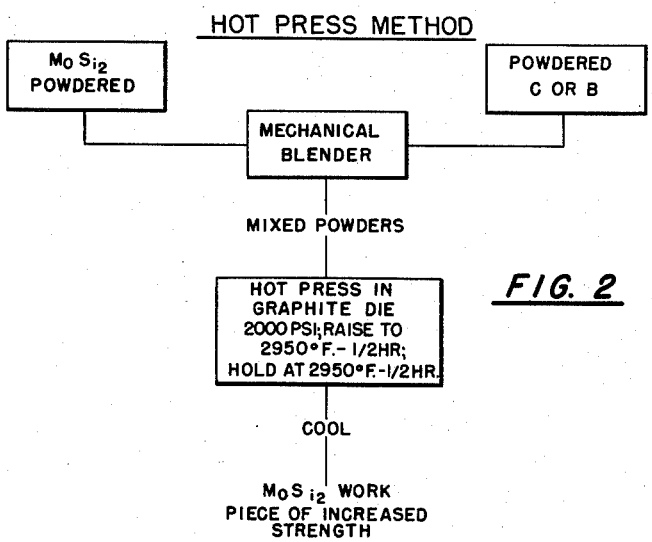
INVENTOR
WILLIAM A. MAXWELL
BY R. J. Tompkins
ATTORNEY

United States Patent Office 2,898,660
Patented Aug. 11, 1959

2,898,660

METHOD FOR IMPROVING THE HIGH-TEMPERATURE STRENGTH AND OTHER PROPERTIES OF MOLYBDENUM DISILICIDE AND OTHER INTERMETALLIC COMPOUNDS

William A. Maxwell, Bay Village, Ohio

Application April 24, 1953, Serial No. 351,060

9 Claims. (Cl. 25—156)

(Granted under Title 35, U.S. Code (1952), sec. 266)

This invention relates to a refractory composition having an intermetallic compound as a base substance. More particularly, the invention pertains to a composition of molybdenum disilicide with additives of nonmetallic elements having low atomic radii.

The use of intermetallic compounds, such as the disilicides of molybdenum, chromium, titanium, tungsten and zirconium is disclosed in the copending application of Roger A. Long, Serial No. 177,548, filed August 3, 1950, now abandoned, as applied to refractory uses such as gas turbines. While the disilicide alone is adequate for many applications experimental investigation has demonstrated that the high temperature strength of this substance may be markedly increased, both for short and long time periods, by the addition of a small percentage of a non-metallic element such as carbon, boron, nitrogen or phosphorous.

It is the object of the invention, therefore, to provide a composition which possesses outstanding strength and resistance to oxidation at high temperatures while retaining adequate properties of hardness, workability and economy of manufacture.

An object, also, is to provide a process for making the mentioned composition.

Further objects and advantages of the invention will become apparent on consideration of the following detailed description.

In detailing the process of making the composition reference will be made to molybdenum disilicide as a satisfactory base intermetallic compound. This is prepared by taking silicon and molybdenum, powdered to a fineness passing a 325 mesh, and proportioned in the stoichiometric ratio of two gram atomic weights to one, and firing at 1500° F. or above a tamped mass of the same. The fired product is then crushed and ground for 96 hours in water to meet approximately the following size specifications:

Particle size (microns): Percent of particles
6 or less _____ 100
1 or less _____ 98

After purification of the molybdenum disilicide, as by leaching with acid, carbon is added in the form of graphite, powdered to pass a 100-mesh screen, in the ratio of 0.5 gram graphite to 99.5 grams molybdenum disilicide and the mass mixed in a mechanical blender. In the cold-press process the mixed powders are inserted in a suitable die and cold-pressed mechanically at 10,000 pounds per square inch (p.s.i.) to obtain the desired form. The work piece is then sintered by placing in a vacuum furnace and heating in a two-hour period to 2500° F., at which temperature it is held for two hours and then allowed to cool to room temperature.

Alternatively, a hot pressing step may be used, in which the mixed powders are placed in a graphite die under a pressure of 2000 p.s.i. and heated in a one-half hour period to 2950° F. the final temperature being held for one-half hour. In the hot pressing step the particle size should average at nine microns instead of about one micron, as for the powder used for the cold pressing method. A typical size determination shows 99% of the particles less than fifteen microns diameter.

To determine the effects of additives on molybdenum disilicide the modulus of rupture was obtained for both the cold-pressed and hot-pressed product. The following table gives the carbon and oxygen content, the density and short time modulus of rupture for the cold and hot pressed compositions at a temperature of 2000° F.:

*Table 1*

COLD-PRESSED PRODUCT

| Carbon Content (percent) | Oxygen Content (percent) | Density (g./ml.) | Modulus of Rupture (lb./sq. in.) |
|---|---|---|---|
| 0.09 | 1.4 | 6.02 | 50,500 |
| 0.15 | ----- | 5.92 | 87,800 |
| 0.29 | 1.2 | 5.88 | 84,700 |
| 0.27 | ----- | 5.82 | 81,800 |
| 0.35 | 1.0 | 5.82 | 50,700 |
| 1.76 | 0.15 | 4.9 | 18,300 |

HOT-PRESSED PRODUCT

| 0.34 | 0.42 | 6.20 | 74,800 |

From the above table it appears that the addition of only 0.06% of carbon to the cold-pressed composition results in an increase of 37,300 lb./sq. in. in the modulus of rupture. It is further noted that with an increase in carbon the oxygen content as well as the density and modulus of rupture decrease, there being a narrow range of about 0.15 to 0.30 percent of carbon content where marked improvement in the modulus results. The oxygen content ranged from 1.0 to 1.4 percent.

The exact nature of the chemical action taking place with carbon addition is not surely known but chemical analysis has clearly indicated formation of silicon carbide. Also, it is likely that some detrimental molybdenum oxides, such as $MoO_3$ with its high vapor pressure, are reduced by the carbon in the sintering step. It is noted that in the high modulus compositions the oxygen content ranges from 1.0 to 1.4 and it may be that the oxygen is the critical factor, the carbon or other additive serving to proportion the oxygen content to the range of greatest strength. Generally stated, the reactions involved in the process include de-oxidation, intermetallic compound formation and interstitial formations.

While the strength of the cold-pressed product is higher than that of the hot-pressed product for short time periods it has been determined that the hot-pressed product is superior in long time deformation properties as brought out by flexure-creep tests. The following table gives comparative tests for both the cold-pressed and hot-pressed products:

*Table 2*

| Specimen | Flexure stress (lb./sq. in.) | Hours under stress | Approx. elongation bottom fibre (percent) | Method of preparation | Carbon (percent) | Oxygen (percent) |
|---|---|---|---|---|---|---|
| 1 | 28,900 | 3½ | 12.5 | cold-pressed | 0.09 | 1.4 |
| 2 | 28,400 | 3½ | 2.1 | ---do--- | 0.27 | 1.2 |
| 3 | 29,800 | 4 | 0.0 | hot-pressed | 0.34 | 0.42 |
| 4 | 30,100 | 24 | 1.0 | ---do--- | 0.34 | 0.42 |

The above table brings out two facts: the addition of carbon to the cold-pressed product decreases deformation by about five-sixths; the time period of deformation resistance of the hot-pressed product over the cold-pressed product, with each sample containing carbon, is increased by about six times. Since the short-time modulus of rupture as shown by Table 1 comes within the range of the values of the cold-pressed product, use of the hot-pressed product is indicated for turbine blades and the like where long term high temperature strength and resistance to deformation are of importance.

The processes of making both the cold-press and hot-press compositions have been described with carbon as the additive, but other additives, as previously indicated, may be used. The distinctive nature of these additives is that they are non-metallic and it is observed that each element has an atomic radius not exceeding 1.15 Angstrom units. In the case of boron, the conditions of preparation for the boron containing material, including temperatures and pressures, being exactly as those described for carbon, the addition of about 0.12 percent boron in the form of molybdenum boride which contains 10.03 percent boron, increased the modulus of rupture of the cold-press product from 51,000 to 88,000 pounds per square inch. Nitrogen is introduced as a silicon or titanium nitride. Phosphorous also has value as additive.

Modifications in the process and product may, of course, be made in the light of this disclosure and is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A process of making a workpiece of refractory composition which comprises granulating molybdenum disilicide to a particle size averaging not over about nine microns, mixing powdered carbon with said molybdenum disilicide, said carbon being in a non-volatile form and being in an amount up to about one-half of one percent of the total weight of the mixture to form about 0.15 to about 0.29 percent carbon in the final sintered material, placing the mix in a die to form a workpiece, under the application of high temperature and high pressure.

2. A process of making a workpiece of refractory composition which comprises granulating molybdenum disilicide to a particle size averaging about one micron, mixing powdered carbon with said molybdenum disilicide, said carbon being in a non-volatile form and being in an amount up to about one-half of one percent of the total weight of the mixture to form about 0.15 to about 0.29 percent carbon in the final sintered material, cold-pressing the mix in a suitable die at pressures around ten thousand pounds per square inch to form a workpiece, and heating the workpiece to a sintering temperature of 2500° F.

3. The process of making a refractory composition as defined in claim 2, with the sintering step including a rise in temperature to 2500° F. in two hours, followed by a retention of the workpiece at said temperature for two hours.

4. A process of making a workpiece of refractory composition which comprises granulating molybdenum disilicide to a particle size averaging about nine microns, mixing powdered carbon with said molybdenum disilicide, said carbon being in a non-volatile form and being in an amount up to about one-half of one percent of the total weight of the mixture, placing the mix in graphite dies, applying a pressure of 2000 pounds per square inch to the mix, and simultaneously heating the mix to 2950° F.

5. The process of making a refractory composition as defined in claim 4, with the heating step including a rise in temperature to 2950° F. in a time period of one-half hour and retention of the mix at said temperature for one-half hour before permitting it to drop to room temperature.

6. A refractory composition consisting of molybdenum disilicide, oxygen, and carbon, the carbon being present in the approximate range of 0.15 to 0.29 percent by weight.

7. A refractory composition consisting of molybdenum disilicide, oxygen and boron, the boron having a weight percentage of about 0.12 in the composition.

8. A refractory composition consisting of molybdenum disilicide, carbon in the weight percentage of about 0.34 and oxygen in the weight percentage of about 0.42.

9. A process of making a workpiece of refractory composition which comprises granulating molybdenum disilicide to a particle size averaging not over about nine microns, mixing with said molybdenum disilicide powdered carbon in a non-volatile form in an amount up to about 0.50 percent by weight of the mix and submitting said mix to high temperature and high pressure.

References Cited in the file of this patent

UNITED STATES PATENTS

| | | |
|---|---|---|
| 2,242,254 | Mansfield | May 20, 1941 |
| 2,529,333 | Finlay | Nov. 7, 1950 |
| 2,622,304 | Coffer | Dec. 23, 1952 |